UNITED STATES PATENT OFFICE.

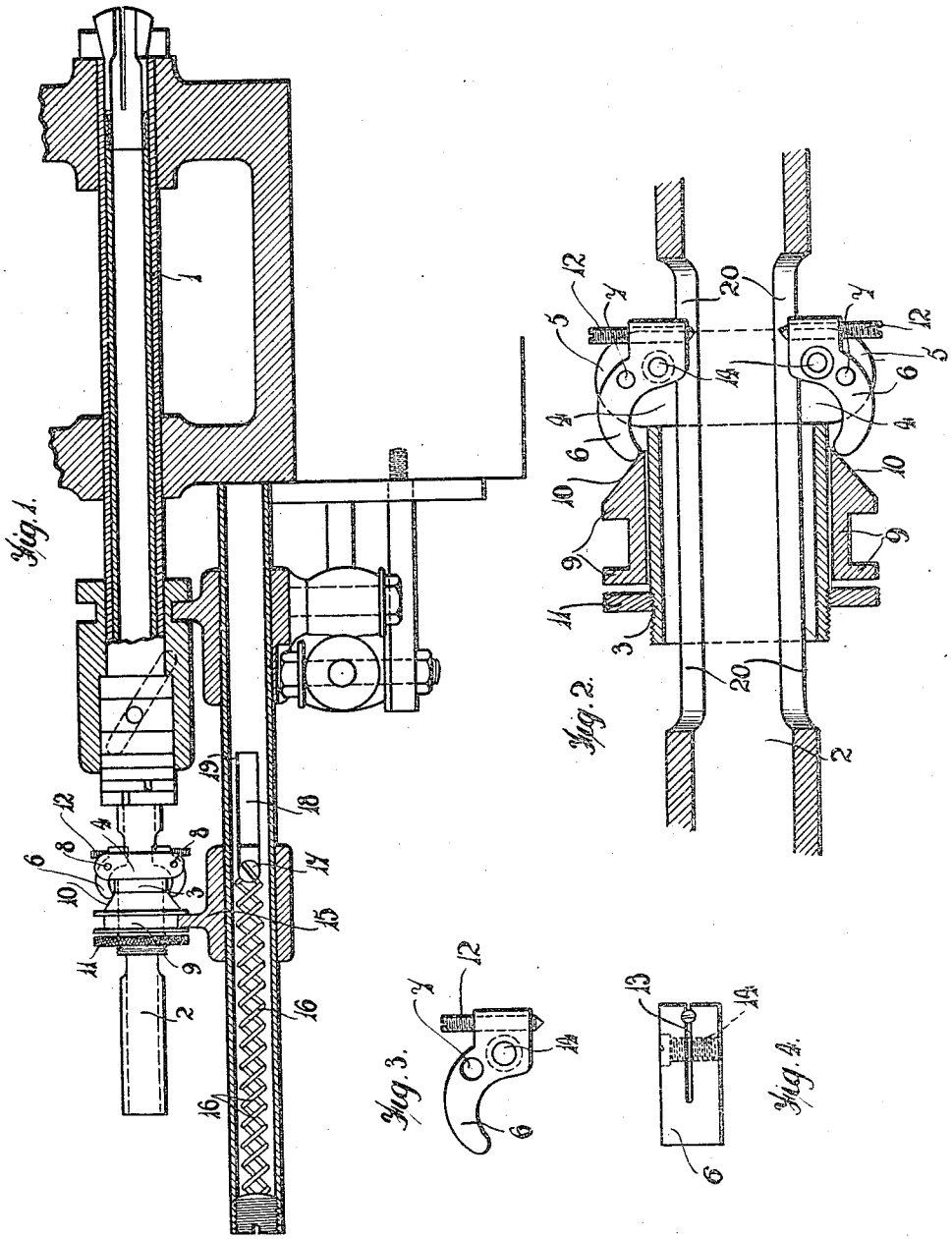

ALBERT HENRY SMITH, OF BIRMINGHAM, ENGLAND.

FEED MECHANISM FOR BAR-STOCK.

1,257,035.  Specification of Letters Patent.  Patented Feb. 19, 1918.

Application filed May 7, 1917. Serial No. 166,920.

*To all whom it may concern:*

Be it known that I, ALBERT HENRY SMITH, subject of the King of Great Britain, residing at 155 St. Luke's road, Birmingham, in the county of Warwick, England, have invented a new and useful Improvement in Feed Mechanism for Bar-Stock; and I do hereby declare the following to be a full, clear, and exact description of the same.

My invention comprises improvements in feed mechanism for bar-stock, of the kind which is commonly employed upon machine tools including capstan and turret lathes for intermittently feeding forward a metal rod from which a large number of articles are successively machined and cut off, and refers to that class of such feed mechanism in which radially disposed gripping members are employed which grip and feed forward the rod when moving in the one direction and pass over same when moving in the other direction; the object of the present invention being to provide an improved gripping device which may be readily adjustable for efficient use upon rods of widely varying diameters without marking such bars.

According to this invention, in a feed collet of the type specified and having a body member, I employ a plurality of gripping fingers pivoted upon the said body member and presenting gripping extremities to engage with the bar-stock in combination with a controlling sleeve having a tapered portion adapted to engage with the fingers and cause their gripping extremities to engage the bar-stock; so arranged that when the sleeve is actuated the bar-stock is fed forwardly.

The gripping extremities are in the form of screws adjustably mounted in the fingers and having points on their inner extremities which are adapted to engage with the bar-stock, the adjustment of the screws providing for considerable variations in the diameter of the bar-stock.

Referring to the drawings:—

Figure 1 is a longitudinal section of a lathe spindle provided with feed mechanism in accordance with this invention.

Fig. 2 is an enlarged sectional view of the feed mechanism.

Figs. 3 and 4 are side elevation and plan respectively of one of the gripping fingers removed.

In carrying this invention into practice as illustrated upon the accompanying drawings, the lathe spindle 1 is provided with a tubular member 2, for controlling the chucking mechanism in manner described in my prior British Specification No. 15744 A. D. 1908, said tube 2 having a sleeve-like body member 3 which has a part 4 of greater diameter and which is cut away to provide recesses 5 in which the fingers 6 are pivoted by means of the holes 7 and pins 8. As shown there are two fingers, but three or more may be used if so desired.

Disposed around the body member 2 is a controlling sleeve 9 having an externally tapered portion 10 which is adapted to engage with one end of each of the pivoted fingers, so that when this controlling sleeve is moved longitudinally the pivoted fingers are caused to engage with the bar-stock in manner hereinafter explained. An adjustable ring 11 is provided upon the body 3 against which the controlling sleeve abuts on its return movement, thus causing the whole of the feed collet to recede.

Each of the fingers is provided with an adjustable screw 12 having a hardened point adapted to engage with the work, the fingers being split as at 13 and provided with a transversely disposed screw 14 which serves to firmly lock the screws in their adjusted positions.

The collet is controlled by the sliding member 15 which may be actuated by hand or automatically as desired, this sliding member being advanced by a spring 16 abutting against a pin 17 disposed across the abutting member and adapted to move in the slot 18 in the supporting shaft 19. This spring serves to keep the controlling sleeve pressed up against the fingers causing them to grip the bar-stock ready for feeding forward.

By adjusting the screws 12 a considerable variation in the effective gripping diameter may be obtained say from one eighth of an inch to three quarters of an inch.

The fingers 6 pass through slots 20 in the tube 2, the fingers thus functioning as sliding keys permitting the collet to move longitudinally relatively to the tube 2, but causing them to rotate together.

An important advantage of this feed collet is that although the gripping fingers are constantly held in engagement with the bar-stock, yet the bar-stock is not marked, for the gripping fingers and collet are compelled to rotate with the work.

Instead of employing a screwed pin, a plain one might be used and secured by a similar transverse locking pin.

What I claim then is:—

1. In a feed collet for machine tools, the combination of a body member, a plurality of gripping fingers pivoted upon said body, an adjustable and pointed member carried by each of said fingers and adapted to engage with the bar-stock, and a controlling sleeve having a tapered portion adapted to engage with the fingers and cause the said adjustable and pointed members to engage the bar-stock and feed it forwardly.

2. In a feed collet for machine tools the combination of a body member; a plurality of gripping fingers pivoted upon said body; an adjustable screw carried by each of said fingers and having a point adapted to engage with the bar-stock; and a controlling sleeve having a tapered portion adapted to engage with the fingers and cause their gripping ends to engage and feed forward the bar-stock; for the purpose specified.

3. In a feed collet for machine tools the combination of a body member adapted for longitudinal but not rotary movement in relation to the lathe spindle; a plurality of gripping fingers pivoted upon said body; an adjustable screw carried by each of said fingers and having a point adapted to engage with the bar-stock; a sleeve having an externally tapered portion adapted to engage with the fingers and cause their gripping ends to engage the bar-stock; and means for moving said sleeve longitudinally so as to cause the fingers to engage and feed forward the bar-stock; for the purpose specified.

4. In a feed collet for machine tools the combination of a body member; a plurality of gripping fingers pivoted upon said body; an adjustable screw carried by each of said fingers and having a point adapted to engage with the bar-stock; means for locking said screws in their adjusted positions; and a controlling sleeve having a tapered portion adapted to engage with the fingers and cause their gripping ends to engage and feed forward the bar-stock; for the purpose specified.

5. In a feed collet for machine tools the combination of a body member adapted for longitudinal but not rotary movement in relation to the lathe spindle; a plurality of gripping fingers pivoted upon said body; an adjustable screw carried by each of said fingers and having a point adapted to engage with the bar-stock; means for locking said screws in their adjusted positions; a sleeve having an externally tapered portion adapted to engage with the fingers and cause their gripping ends to engage the bar-stock; and means for moving said sleeve longitudinally so as to cause the fingers to engage and feed forward the bar-stock; for the purpose specified.

6. In a feed collet for machine tools, the combination of a body member, a plurality of gripping fingers pivoted upon said body member and having split extremities, an adjustable and pointed member carried in each of said split extremities, means for clamping said split extremities around the said adjustable and pointed members, and a controlling sleeve having a tapered portion adapted to engage with the fingers and cause the said adjustable and pointed members to engage the bar-stock for the purpose specified.

In testimony whereof I affix my signature.

ALBERT HENRY SMITH.

Copies of this patent may be obtained for five cents each, by addressing the "Commissioner of Patents, Washington, D. C."